No. 720,154. PATENTED FEB. 10, 1903.
P. L. KIMBALL.
CENTRIFUGAL SEPARATOR.
APPLICATION FILED JAN. 10, 1902.
NO MODEL. 6 SHEETS—SHEET 3.

No. 720,154. PATENTED FEB. 10, 1903.
P. L. KIMBALL.
CENTRIFUGAL SEPARATOR.
APPLICATION FILED JAN. 10, 1902.
NO MODEL. 6 SHEETS—SHEET 4.

No. 720,154. PATENTED FEB. 10, 1903.
P. L. KIMBALL.
CENTRIFUGAL SEPARATOR.
APPLICATION FILED JAN. 10, 1902.
NO MODEL. 6 SHEETS—SHEET 5.

Witnesses
C. F. Kilgore
D. H. Kummerdahl

Inventor
Porley L. Kimball
by Simonds ——
Attorneys

No. 720,154. PATENTED FEB. 10, 1903.
P. L. KIMBALL.
CENTRIFUGAL SEPARATOR.
APPLICATION FILED JAN. 10, 1902.
NO MODEL. 6 SHEETS—SHEET 6.

UNITED STATES PATENT OFFICE.

PERLEY L. KIMBALL, OF BELLOWS FALLS, VERMONT.

CENTRIFUGAL SEPARATOR.

SPECIFICATION forming part of Letters Patent No. 720,154, dated February 10, 1903.

Application filed January 10, 1902. Serial No. 89,190. (No model.)

*To all whom it may concern:*

Be it known that I, PERLEY L. KIMBALL, a citizen of the United States of America, residing and having my post-office address at Bellows Falls, in the county of Windham and State of Vermont, have invented a certain new and useful Improvement in Centrifugal Separators, of which the following is a description, reference being had to the accompanying drawings, wherein—

Figure 1:
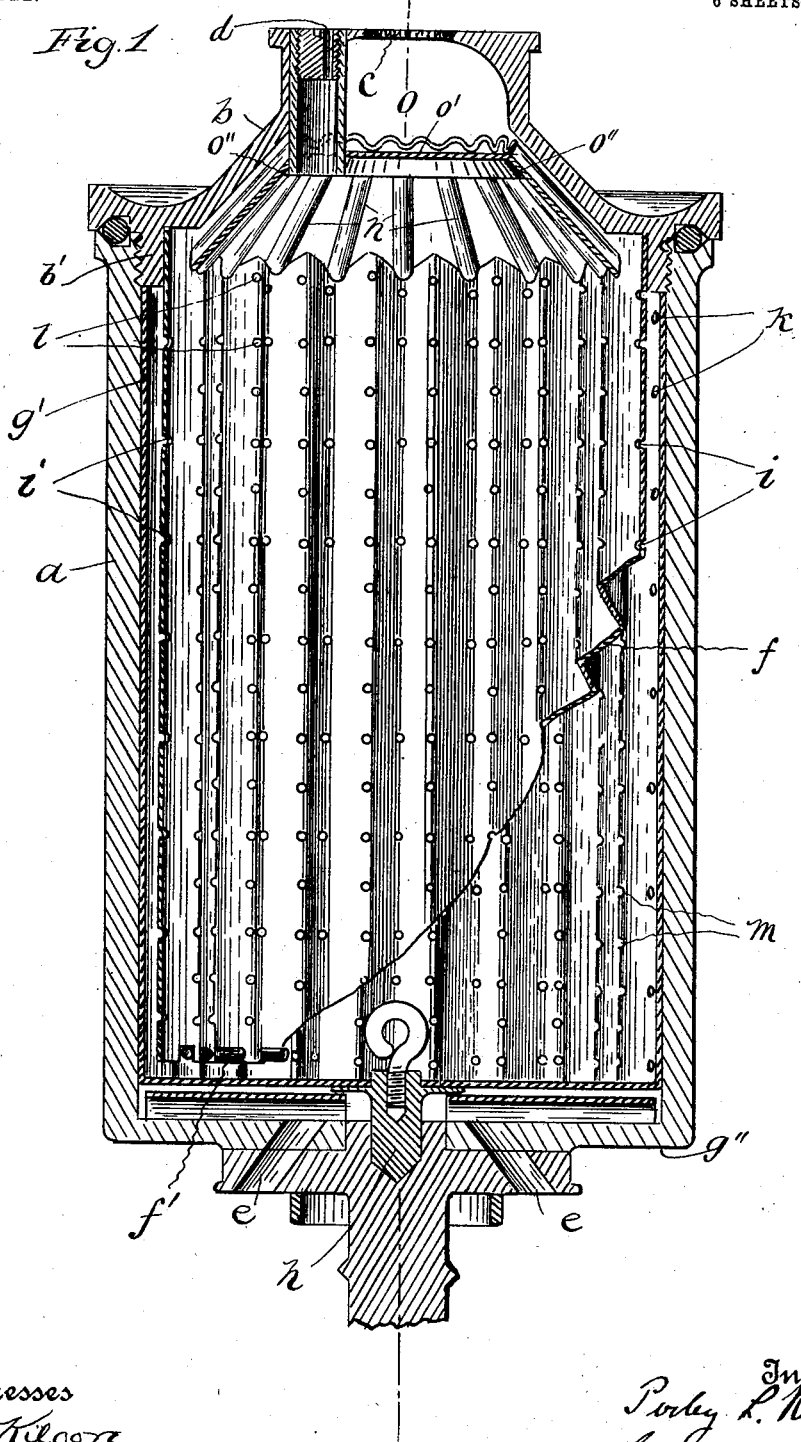
Figure 2:
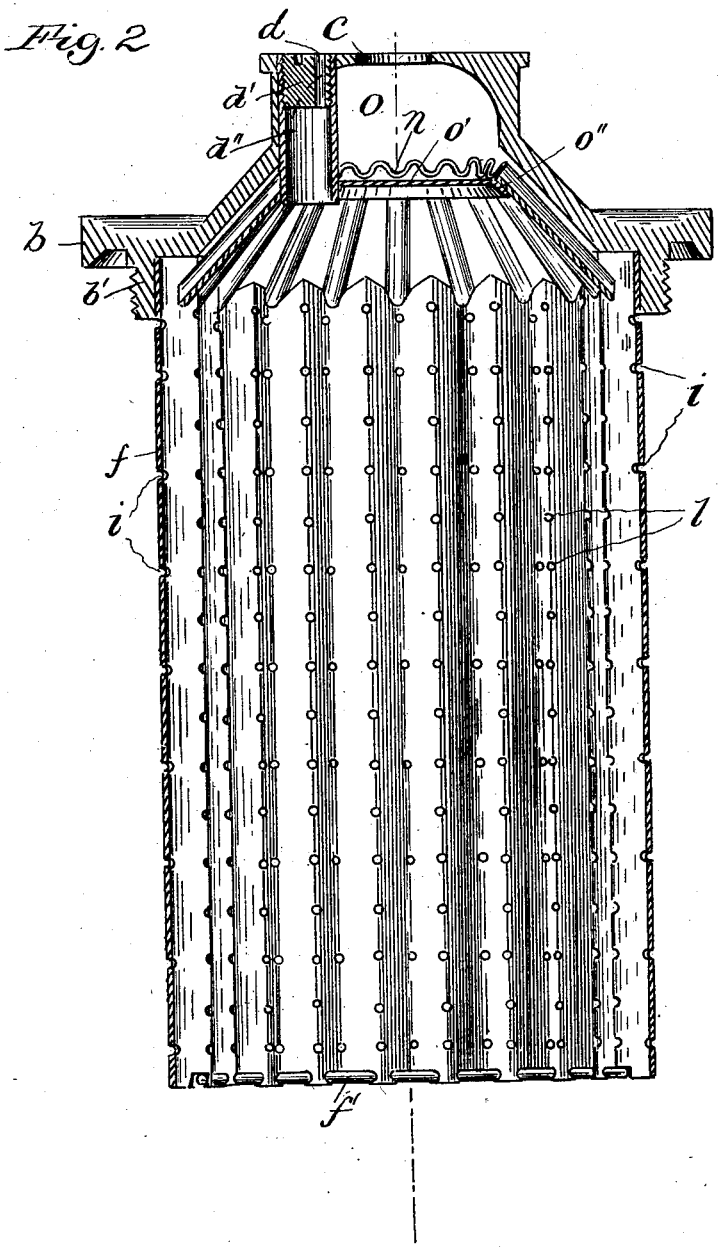
Figure 3:
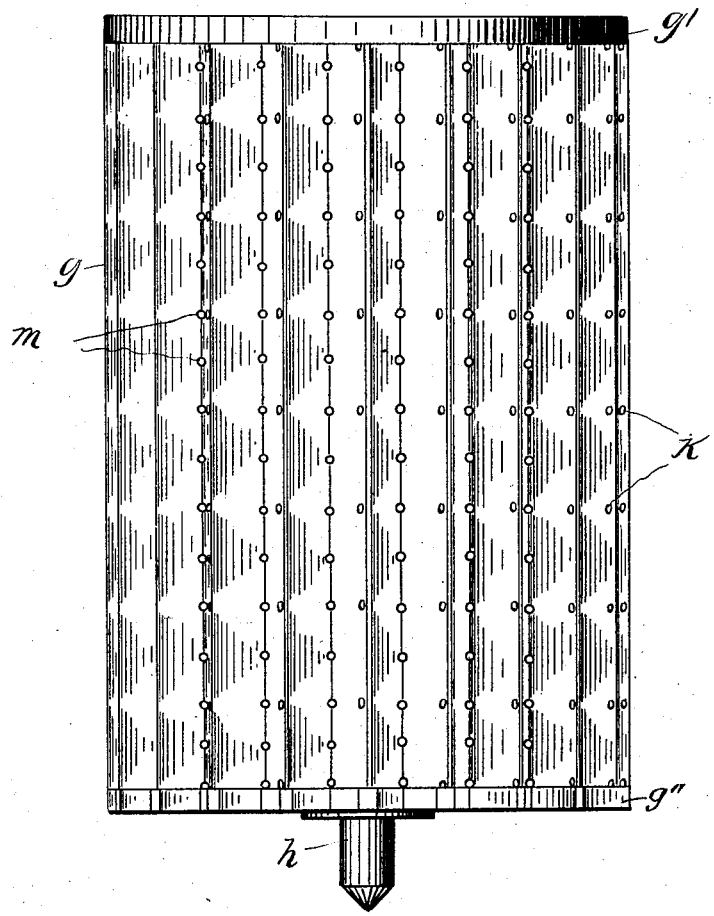
Figure 4:
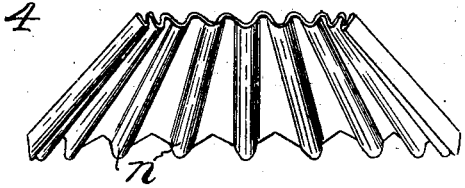
Figure 5:
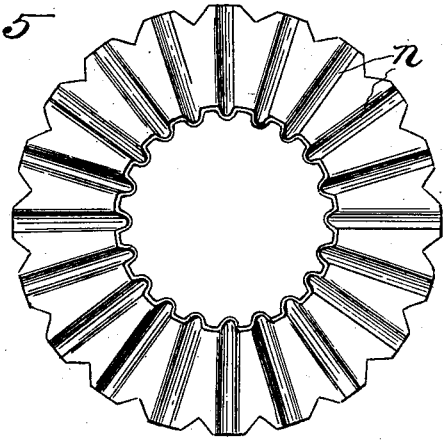
Figure 6:
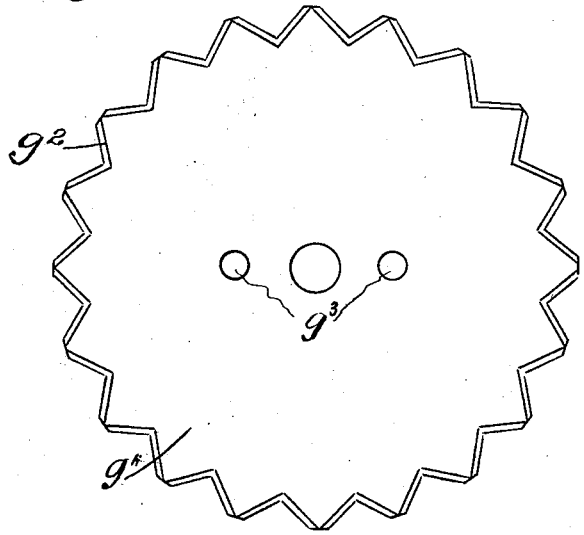
Figure 7:
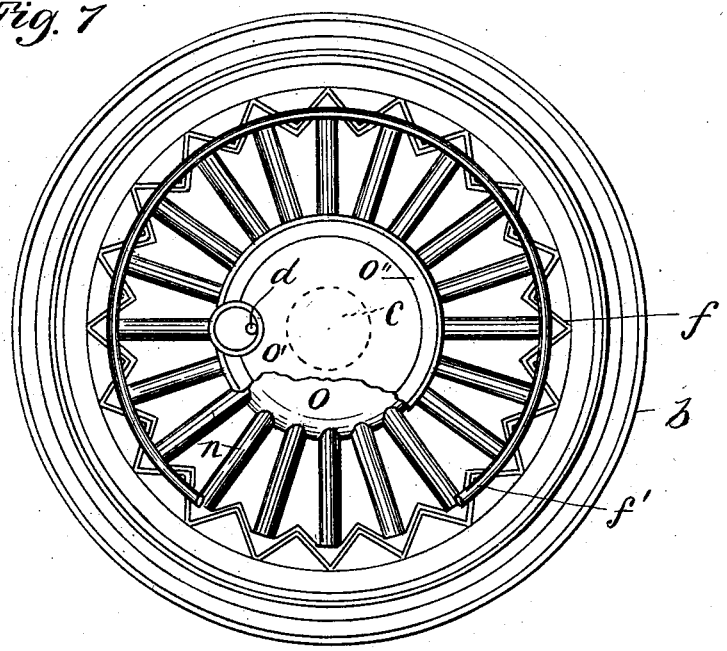
Figure 8:
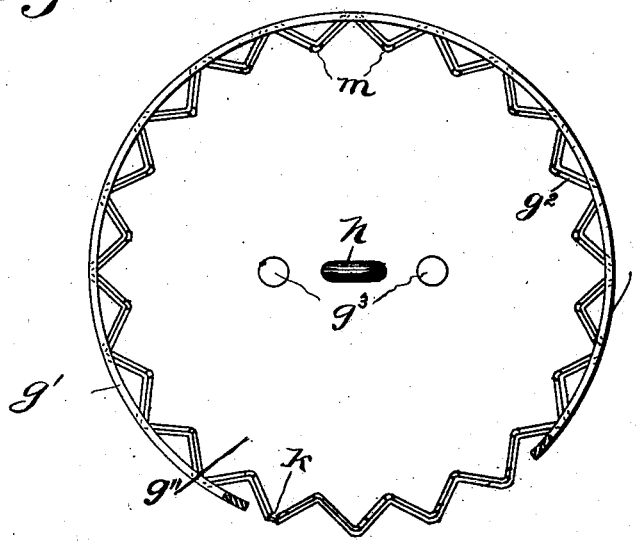
Figure 9:
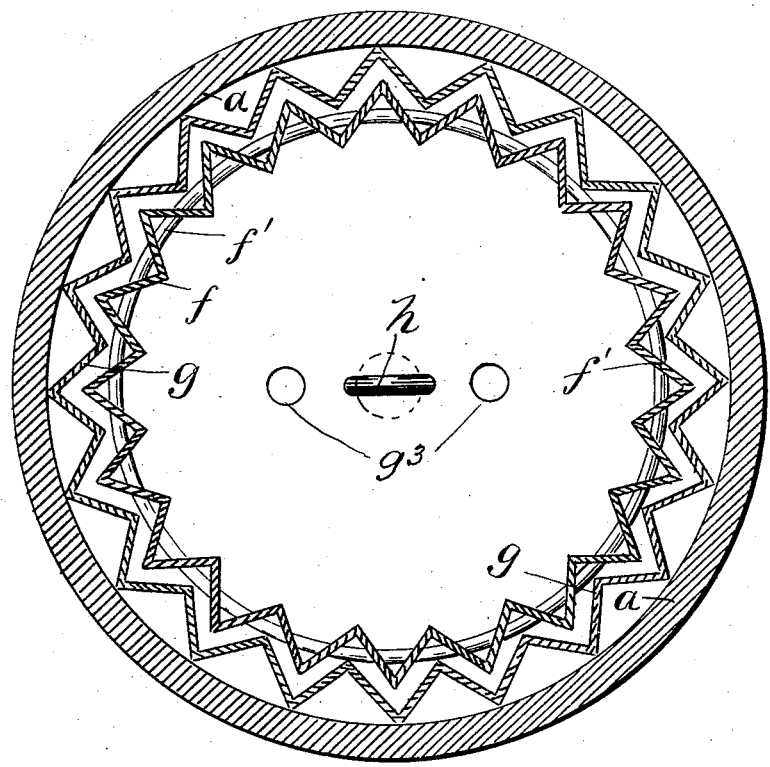

Figure 1 is a view in central vertical section of a separator embodying said improvements, a part of the inner partition being represented as broken away. Fig. 2 shows a view in central vertical section of the separator-cover and its appurtenant parts and of a partition carried by the cover. Fig. 3 is an elevation view of a partition adapted to be centrally supported underneath by the floor of the separator-body and laterally by the wall of the separator-body. Fig. 4 is a view in central vertical section of a part appurtenant to the cover in which certain feed-conduits, hereinafter mentioned, are located. Fig. 5 is a view looking downward from above on the part shown in Fig. 4. Fig. 6 is a top view of the floor of the outer corrugated partition. Fig. 7 is an underneath or bottom view of the separator-cover and the inner corrugated partition depending therefrom. Fig. 8 is an upper end view of the outer corrugated partition. Fig. 9 is a horizontal section of the bowl of Fig. 1 with the parts contained therein.

The object of the improvement is the production of an apparatus for separating mixed fluids of different densities, notably for separating the cream from the so-called "blue milk," as the two are contained together in what is known as "full milk."

The apparatus is hereinafter described as applied to cream separation.

The letter $a$ denotes the separator-body, which, as is well known, in operation is given some thousands of turns a minute.

The letter $b$ denotes the separator-cover, which may well be secured to the separator-body by a flange $b'$, having screw-thread connections with a suitable rubber packing-ring between the two. This cover is preferably of dome shape, provided with a central inlet $c$ for the inflow of full milk and an adjustable non-central outlet $d$ for the outflow of cream. Any suitable means may be provided for effecting this adjustment; but in the present case I have shown the outlet proper as a port passing longitudinally and eccentrically through a screw-plug $d'$, threaded into a tube $d''$, which is fixed non-centrally within the cover $b$. The blue milk escapes through the outlets $e$ at the bottom.

The letter $f$ denotes an inner partition of corrugated material depending from, supported by, and preferably fixed within the flange $b'$ of the cover, so as to be removable therewith, as for cleaning or repair.

The letter $g$ denotes an outer partition, also preferably of corrugated material and with corrugations substantially of the size of those of the inner partition $f$, and this partition has a floor $g''$, which is supported by the separator-body through the medium of the axial pintle-journal $h$. The upper extremity of this outer partition preferably stands below the lower end of the flange $b'$, which holds it in place upon and around said pintle-journal, while the inner partition $f$ is sustained by the cover and is of such length that its lower extremity stands slightly above said floor $g''$, as best seen in Fig. 1.

The letter $i$ denotes milk-flow passages through the inner partition, (the one carried by the separator-cover,) and the letter $k$ denotes milk-flow passages in the outer partition. Those of the inner partition are located at the outer apices of the corrugations, as shown in the drawings. Those of the outer partition are located near the outer apices of the corrugations, although it is apparent that they might be in the apices. In common language the two sets of milk-flow passages are "staggered"—that is, out of horizontal alinement with each other—so as in a measure to obstruct the outward flow of the milk and afford an increased time for separation of the cream therefrom.

The letter $l$ denotes cream-flow passages through the inner partition, and the letter $m$ denotes cream-flow passages through the outer partition. These are both located at the inner apices of the corrugations.

The letter $n$ denotes feed-conduits for conducting and distributing the incoming full milk. They are connected to and with the full-milk inlet $c$ through the medium of the intervening chamber o, having for its bottom a plate o' with downturned flanged edge o'', fixed within the corrugations constituting said conduits. These parts may well be brazed together; but in any event the plate o' is pierced non-centrally for the passage of the cream-outlet tube d'', which is also fixed thereto and projects at its inner end considerably therebelow, while its outer end is within the dome of the cover. There is no communication between the cream-tube d'' and the chamber o and conduits n for the milk.

The letter f' denotes a reinforce-ring carried by the inner partition, and the letter g' denotes a similar reinforce-ring carried by the outer partition. The use of these two reinforce-rings permits the partitions to be made of thin material, which is desirable for different reasons.

In the operation of the machine the separator as a whole is given several thousand turns a minute, as already mentioned. The full milk is fed into the separator through the inlet c. It goes thence through the chamber o, spreads over the plate o', and then flows along the feed-conduits n to and within the corrugations of the inner partition, the delivery ends of these feed-conduits being outside of the circle which is described by the cream-outlets when in rotation. The milk takes on the whirling motion of the separator, and the cream being of less specific gravity than the watery portions of the milk forms a core at the center and finally escapes through the cream-outlet d''. Meanwhile a portion of the milk works downwardly along the inner surface of the inner partition and a portion laterally through the milk-flow passages of the inner partition. When the downward current of milk reaches and passes out the lower end of the inner partition, centrifugal action immediately forces it outward laterally against the outer partition, when it begins an upward travel. When it has completed that upward travel, it passes through the large holes in the upper end of the outer partition and thence downward along the interior wall of the separator-body and finally escapes through the blue-milk outlets e. While this is going on, more or less of the milk is passing laterally outward through the milk-flow passages and more or less of the cream is passing inward through the cream-flow passages to the cream-core at the center of the separator, and the final effect is that the cream is very thoroughly separated from the more watery constituents, commonly called "blue milk." The cream-flow passages of the inner partition are within the circle which is described by the delivery ends of the feed-conduits in their rotation. The inner partition is rotated by the flange b' of the cover, and the full milk that enters through the feed-conduits rapidly assumes the whirling action of this inner partition. While the outer partition is journaled on the pintle and held in place by the inner wall of the separator-body a and the inner end of the flange b', it yet takes its whirling action from frictional contact with the body and the power imparted to it by the whirling milk flowing out the lower end of the inner partition and radially through the flow-passages in this inner partition. The outer partition may not get up to its required speed at once; but if it did it would be likely to paddle the milk and produce globules of butter therein, which is a thing not at all desirable. After the cover and inner partition are removed the outer partition can be withdrawn for cleaning or repair. Its floor g'' has blue-milk outlets g''', as seen in Figs. 6, 8, and 9.

I claim as my invention—

1. In a centrifugal cream-separator a rotating body having inlet and outlet, a plurality of partitions located one within the other within the body, and cream-flow openings through said partitions, in combination with a substantially vertical series of milk-flow openings through both partitions independent of the cream-flow openings, said milk-flow openings in one partition being out of alinement with those in the other partition.

2. In a centrifugal cream-separator the combination with an upright rotating cylindrical body having inlet and outlet, of a plurality of concentric corrugated perpendicular partitions located within the body, milk-flow openings at or near the outer apices of the two partitions, those in one partition being out of horizontal alinement with those in the other.

3. In a centrifugal cream-separator, the combination with an upright rotating cylindrical body having inlet and outlet; of a plurality of concentric angularly-corrugated perpendicular partitions located within the body and provided with milk-flow openings near but not in the outer apices of the outer partition and in the outer apices of the inner partition—those in one partition being out of horizontal alinement with those in the other.

4. In a centrifugal cream-separator, the combination with an upright rotating cylindrical body having inlet and outlet; of a pair of concentric angularly-corrugated partitions located within the body and provided with openings near but not in the outer apices of the outer partition and in all the other apices—those in one partition being non-alined with those in the other—and independent means for preventing the spreading of the two partitions.

5. In a centrifugal separator, the combination with a body having inlet and outlet; of a partition cylindrical in contour but angularly corrugated longitudinally and supported concentrically within the body, and a reinforcing-ring secured to the partition and crossed by all of the corrugations.

6. In combination, the cylindrical separator-body having outlets in its bottom, and the outer partition having a corrugated perforated wall fitting frictionally and removably within said body and perforated floor; the separator-cover having an axial inlet, an inner corrugated perforated partition fixedly carried by the cover with its lower end above the floor of the outer partition, and a reinforce-ring carried by this partition, substantially as described.

7. In combination, the cylindrical separator-body having outlets in its bottom, the outer partition having a corrugated perforated wall fitting frictionally and removably within said body and a perforated floor, an axial pivot between said floor and the bottom of the body, and a reinforce-ring carried by this partition; with the separator-cover having an axial inlet, an inner corrugated perforated partition fixedly carried by the cover with lower end above the floor of the outer partition, and a reinforce-ring carried by this partition, substantially as described.

8. In combination, the imperforate cylindrical separator-body having blue-milk outlets in its bottom, and the outer corrugated partition whose outer apices are frictionally supported along their entire length within said body, said partition having sets of flow-passages in and near its apices; the cover having an axial inlet leading to a chamber and feed-conduits diverging obliquely from said chamber toward the wall of the separator-body; the inner partition positively rotated by said cover and having corrugations into which said conduits deliver, and sets of flow-passages in all its apices; and means for preventing the spreading of this partition; substantially as described.

9. In combination, a separator-body having blue-milk outlets at its bottom, and a corrugated partition within the body and rotated thereby; with a removable dome-shaped cover containing a chamber, a bottom plate therein surrounded by a flange, a flaring corrugated plate secured around said flange and forming feed-conduits leading from the chamber to within the partition, and a cream-outlet tube extending non-centrally through said plate and chamber, substantially as described.

PERLEY L. KIMBALL.

Witnesses:
H. W. LADD,
LEON J. BALL.